United States Patent
Kusunoki et al.

(10) Patent No.: US 8,132,607 B2
(45) Date of Patent: Mar. 13, 2012

(54) TIRE PRESSURE CONTROL SYSTEM, TIRE PRESSURE CONTROL DEVICE AND TIRE PRESSURE CONTROL METHOD

(75) Inventors: Hideki Kusunoki, Nishikamo-gun (JP); Suminobu Takamori, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 477 days.

(21) Appl. No.: 12/442,712

(22) PCT Filed: Dec. 5, 2007

(86) PCT No.: PCT/IB2007/003775
§ 371 (c)(1),
(2), (4) Date: Mar. 25, 2009

(87) PCT Pub. No.: WO2008/068599
PCT Pub. Date: Jun. 12, 2008

(65) Prior Publication Data
US 2010/0024939 A1 Feb. 4, 2010

(30) Foreign Application Priority Data
Dec. 6, 2006 (JP) ................................. 2006-329048

(51) Int. Cl.
*B60C 23/04* (2006.01)
(52) U.S. Cl. ........... 152/416; 152/415; 340/442; 73/146
(58) Field of Classification Search .................. 152/415, 152/416, 417; 73/146, 146.2; 137/224; 340/442
See application file for complete search history.

(56) References Cited

U.S. PATENT DOCUMENTS

| 6,594,566 | B1 * | 7/2003 | Skoff | 701/36 |
|---|---|---|---|---|
| 6,941,989 | B2 * | 9/2005 | Grotendorst et al. | 152/415 |
| 7,218,209 | B2 * | 5/2007 | Utter et al. | 340/442 |
| 7,248,953 | B2 * | 7/2007 | Ogawa | 701/29 |
| 7,403,105 | B2 * | 7/2008 | Watabe | 340/447 |
| 7,791,460 | B2 * | 9/2010 | Watabe | 340/442 |
| 2004/0231776 | A1 * | 11/2004 | Skoff | 152/416 |
| 2005/0231344 | A1 | 10/2005 | Ogawa | |

FOREIGN PATENT DOCUMENTS

| EP | 1 586 467 | 10/2005 |
|---|---|---|
| JP | 2003 326928 | 11/2003 |
| JP | 2004 17961 | 1/2004 |
| JP | 2006 193015 | 7/2006 |

* cited by examiner

*Primary Examiner* — Kip T Kotter
(74) *Attorney, Agent, or Firm* — Oblon, Spivak, McClelland, Maier & Neustadt, L.L.P.

(57) ABSTRACT

A tire pressure control system that controls the tire pressure in the tire at each wheel of a vehicle includes: a wheel-side tire pressure sensor; a transmitter that transmits the detected tire pressure; a receiver that receives the tire pressure information from the transmitter; a tire pressure regulating device; and a control unit that drives the tire pressure regulating device based on the tire pressure information. The control unit drives the tire pressure regulating device regardless of whether the tire pressure information is received if a reception-incapable condition, in which the receiver is unable to receive the tire pressure information, has occurred.

19 Claims, 8 Drawing Sheets

TIRE PRESSURE CONTROL SYSTEM, TIRE PRESSURE CONTROL DEVICE AND TIRE PRESSURE CONTROL METHOD

BACKGROUND OF THE INVENTION

1. Field of the Invention

The present invention relates to a tire pressure control device that regulates the tire pressure for a vehicle, a tire pressure control system that includes the tire pressure control device, and a tire pressure control method.

2. Background of the Invention

A conventional apparatus that supplies air pressure from a vehicle body side to a tire when a tire pressure is determined to be decreasing based on the information obtained by using a control device provided in the vehicle body and a tire pressure sensor installed on the wheel side to detect the tire pressure (see, e.g., Japanese Patent Application Publication No. JP-A-2003-326928).

A compressor that compresses air, a reservoir that retains the compressed air, and an electronic valve that regulates the air pressure supplied to and discharged from a tire, are provided on the vehicle body side. At least a tire pressure sensor is provided on the wheel side. In addition, a seal member to ensure an airtight seal is provided at a portion where a line from the wheel is connected with a line from the vehicle body. A signal detected by the tire pressure sensor in each of the wheels is transmitted to the control device in the vehicle body side via a communication line.

Recently, a tire pressure monitoring system (hereinafter, referred to as "TPMS") has also been provided. The TPMS includes a wheel side device for detecting the tire pressure at each wheel and transmitting the tire pressure information by wireless transmission; and a vehicle body side apparatus that receives the transmitted tire pressure information and monitors the tire pressure at each wheel. In the TPMS, a transmitter that transmits wheel information, including the tire pressure information, is provided at each wheel and an electronic control unit (hereinafter, referred to as "ECU") that receives the wheel information to perform specified operation processes thereon, and displaying the information indicating tire pressure deficiency and the like on an indicator is provided at the vehicle body side.

Thus, in a vehicle equipped with the TMPS, it is considered to be efficient to control the tire pressure based on the tire pressure information received through the wireless transmission from the wheel side device. However, in case that the vehicle body side cannot receive the tire pressure information, it becomes difficult to supply the air pressure to the tire.

At first, Radio Regulation Laws in different countries need to be considered. For example, since North America and Japan have different Radio Regulation Laws, an output level of radio waves permitted in North America may not be permitted in Japan. In that case, when a vehicle equipped with the TPMS fitted to be used in North America receives a transmission stop instruction through a specified tool in a vehicle assembly factory in Japan, the transmission from the transmitter is temporarily stopped. At this time, the transmitter of each wheel transmits a sleep signal indicating that there will be no further transmission after transmitting thereof to the vehicle body apparatus and transfers the driving mode of the vehicle to a transmission stop mode. When receiving the sleep signal, the ECU makes an indicator lamp blink several times in order to notify that transmission is stopped, but also continues to perform other processing thereafter, without determining a state that there are no received radio waves from the transmitter as an anomaly. As a result, even if the tire pressure decreases during the transmission stop mode of the transmitter, the ECU does not regulate the tire pressure and, also, a driver cannot recognize the tire pressure decrease. The anomaly in the tire pressure will be detected for the first time when being driven again by using a specified tool after the vehicle is exported to and arrives in North America.

Next, there may be various noises in the environment, and, accordingly, a noise having a similar pattern with that of the transmission stop instruction from the aforementioned tool may be included therein. When receiving such a noise, the transmitter may confuse the noise with the transmission stop instruction to stop the transmission. As a result, even if the tire pressure decreases, the ECU cannot recognize the tire pressure decrease. In case that the vehicle side apparatus cannot normally receive transmission waves from the transmitter, e.g., due to other noises or interfering waves generated in the environment, the ECU cannot process the tire pressure information.

In addition, when the TPMS itself has been broken down, the vehicle body cannot normally receive the tire pressure information thereafter, and therefore the ECU does not recognize the tire pressure decrease even if the tire pressure actually decreases. In such a case of the TPMS breaking down as aforementioned, the indicator lamp is turned on to notify the breakdown of the TPMS, but a driver may not understand why the indicator lamp is turned on. In that case, it is probable that the driver drives the vehicle even while the TPMS does not work and the driver feels a change in a tire state until the vehicle is brought into a dealer.

The above-described problems are caused in the TPMS in which information is wirelessly transmitted. However, similar problems may be caused even in a TPMS that indirectly estimates the tire pressure using a wheel speed sensor. These problems may be caused when an ECU becomes unable to process the tire pressure information due to a malfunction in the wheel speed sensor or braking of a wire from the wheel speed sensor to the ECU.

Meanwhile, there may be considered a system configured such that an tire pressure regulating device is constantly operated regardless of whether the tire pressure decreases, and when the tire pressure exceeds a specified value, the excess air is discharged to the outside by using a pressure regulating valve. However, this system is inefficient in that the tire pressure regulating device is unnecessarily driven and has trouble with durability such that the seal member for ensuring airtightness is prone to wear by sliding friction.

SUMMARY OF THE INVENTION

The present invention provides a tire pressure control for a vehicle that enhances the safety of a vehicle by properly operating the tire pressure regulating device.

In accordance with a first aspect of the present invention, there is provided a tire pressure control system that controls the tire pressure at each wheel of a vehicle, including: a wheel side pressure sensor, installed at each wheel, that detects the tire pressure thereof; a transmitter, installed at each of the wheels, that wirelessly transmits of tire pressure information that indicates the detected tire pressure; and a receiver, installed at a vehicle body, for receiving the tire pressure information transmitted from the transmitter. Further, the tire pressure control system includes: a tire pressure regulating device, installed at the vehicle body, that regulates the tire pressure by supplying and discharging air to and from the tire; and a control unit that controls the adjustment of the tire pressure to a target tire pressure by driving the tire pressure regulating device based on the tire pressure information received by the receiver, wherein the control unit drives the tire pressure regulating device regardless of whether the tire pressure information is received if a reception-incapable condition occurs in which the receiver is unable to receive the tire pressure information.

The control unit may determine that the reception-incapable condition occurs if the receiver has not received the detected tire pressure information for a prescribed period of time or longer. Further, the control unit may determine that the reception-incapable condition occurs if it receives transmission stop information, which gives an advance notice of transmission stop, from the transmitter via the receiver. The reception-incapable condition may occur when the receiver is unable to receive the transmitted information from the transmitter due to noise or interference in the environment for example. The reception-incapable condition may occur when the transmission stop information is transmitted from the transmitter due to reception of the transmission stop instruction according to Radio Regulation Law or due to the confusion by the noises for example. Proper conditions anything else may also be the reception-incapable condition.

At each wheel, the tire pressure information obtained by the vehicle side pressure sensor is transmitted to the receiver by wireless transmission. In the vehicle body side, the receiver receives the tire pressure information and, also, the control unit drives the tire pressure regulating device based on the tire pressure information such that the tire pressure is adjusted to a target tire pressure. Even if the tire pressure information cannot be obtained due to some reason, the control unit drives the tire pressure regulating device, regardless of whether the tire pressure information is received, as long as the preset reception-incapable condition occurs. Therefore, even if a tire pressure decreases when the receiver does not receive the tire pressure information, the air pressure can still be supplied to the tire while the reception-incapable condition occurs. As a consequence, the safety of the vehicle can be improved.

However, a tire pressure may be sufficiently high even when the tire pressure information cannot be obtained. In that case, if the tire pressure regulating device is driven constantly, the tire pressure may exceed the tolerance of the tire. Or, even if the original tire pressure is low, the tire pressure may be increased above an appropriate level by constantly driving the tire pressure regulating device.

Therefore, the tire pressure control system may further include a relief unit for maintaining the tire pressure at or below a preset relief pressure threshold by discharging air in the tire when the tire pressure exceeds the relief pressure threshold. In this configuration, because the tire pressure is maintained below the relief pressure threshold, even if the tire pressure regulating device is constantly driven, an excessive increase in tire pressure is avoided.

When the tire pressure information is obtained, the control unit may control the tire pressure regulating device to decrease the tire pressure to or below an upper limit pressure, and wherein the relief pressure threshold is set to a higher pressure than the upper limit pressure. In other words, the relief pressure threshold may be set higher than the preset upper limit value in the normal tire pressure control.

Accordingly, the unnecessary operation of the relief unit is prevented when the tire pressure information is normally obtained. As a result, the tire pressure is maintained within a range thereof in the normal tire pressure control.

The tire pressure control system may further include a control circuit, installed at each wheel, to regulate the transmission timing of the tire pressure information from the transmitter, wherein the control circuit reduces the interval between the transmission timings of the tire pressure information from the transmitter when an tire pressure variation is detected by the wheel side pressure sensor.

Namely, there may be a situation such that the tire pressure information is transmitted from the transmitter, but cannot be normally received by the receiver, e.g., due to a periodical interfering waves. In this case, the tire pressure information is more likely to arrive in the receiver by reducing the transmission intervals of the transmitter.

Therefore, when the variation of the tire pressure is detected by the wheel side pressure sensor, i.e., when there is a possibility that the tire pressure regulating device is being driven when a reception-incapable condition has occurred, the transmission intervals of the tire pressure information from the transmitter is reduced, thereby increasing the probability that the receiver can receive the tire pressure information. If the receiver can receive the tire pressure information, the control unit performs the tire pressure control based on the air pressure information.

Further, the tire pressure regulating device may include: an air compressor, installed at the vehicle body, that compresses air; an air passage that extends from the air compressor to the inside of the tire; a switching valve for opening and blocking the air passage to the inside of the tire; and a vehicle body side pressure sensor, installed at the vehicle body side, that detects the pressure in the air passage. If it is determined that the reception-incapable condition occurs, the control unit drives the tire pressure regulating device based on tire pressure information obtained from the vehicle body side pressure sensor by opening the switching valve to allow the air passage to communicate with the inside of the tire.

In this configuration, the vehicle body pressure sensor is installed at the air passage. When the air passage communicates with the inside of the tire by opening the switching valve, the tire pressure becomes substantially equal to that in the air passage. Therefore, the tire pressure may be detected by the vehicle body side pressure sensor, or at least the tire pressure can be estimated from a detected pressure by the vehicle body side pressure sensor. Accordingly, even if the tire pressure cannot be directly obtained from the wheel side, the tire pressure may be adjusted to a target tire pressure by driving the tire pressure regulating device based on the tire pressure information obtained from the vehicle body side pressure sensor. However, when the information representing the tire pressure is obtained from the transmitter of the wheel side, it is preferable to use the tire pressure information obtained from the wheel side pressure sensor, which detects the tire pressure more accurately, in order to directly detect the tire pressure.

The control unit may obtain the tire pressure information from the vehicle body side pressure sensor through a communication line arranged in the vehicle body.

Further, the tire pressure regulating device may include: an air pressure tank, installed between the switching valve and the air compressor, that retains the compressed air generated by the air compressor; and a tank pressure sensor for detecting the air pressure in the air pressure tank. If it is determined that the reception-incapable condition occurs, the control unit opens the switching valve to allow the air passage to communicate with the inside of the tire, and obtains tire pressure information from the tank pressure senor as the tire pressure information of the vehicle body side pressure sensor.

When the tire pressure regulating device is being driven, the air pressure tank temporarily stores the compressed air generated by the air compressor. In other words, the air pressure tank assists the air compressor in providing the compressed air by storing a quite large amount of air and providing same when necessary. Therefore, the air pressure in the air pressure tank may be maintained at a prescribed pressure, and a tank pressure sensor may be used to monitor the tire pressure. The tank pressure sensor is useful in this embodiment.

The transmitter may transmit wheel information including the tire pressure information from each wheel to a vehicle body side, and wherein the control unit controls the tire pressure regulating device and monitors states of the wheels based on the wheel information. In this configuration, the tire pressure information included in the wheel information is effectively used wherein the wheel information is obtained in case of the vehicle equipped with the TPMS.

In accordance with a second aspect of the present invention, there is provided a tire pressure control device, installed in a vehicle, that controls the tire pressure at each wheel, wherein the vehicle has: a wheel side pressure sensor, installed at each wheel, that detects the tire pressure in the tire thereof; a transmitter, installed at each wheel, for wireless transmission of tire pressure information indicating the tire pressure; and an tire pressure regulating device, installed on the vehicle body, for regulating the tire pressure by supplying and discharging air to and from the tire. Further, the tire pressure control device outputs, to the tire pressure regulating device, a control signal for controlling the adjustment of the tire pressure to a target tire pressure based on the tire pressure information transmitted from the transmitter. Further, the tire pressure control device outputs a control signal for driving the tire pressure regulating device regardless of whether the tire pressure information is received, if it is determined that a reception-incapable condition occurs to indicate that receiving the tire pressure information is impossible.

In this configuration, even if the tire pressure information cannot be obtained, the control signal for driving the tire pressure regulating device is generated regardless of whether the tire pressure information is received, as long as the preset reception-incapable condition occurs. Therefore, even if the tire pressure in the tire decreases when the vehicle body side cannot obtain the tire pressure information, the air pressure can be supplied to the tire as long as the reception-incapable condition occurs. As a consequence, the safety of the vehicle can be improved.

In accordance with a third aspect of the present invention, there is provided a tire pressure control method of a tire at each wheel of a vehicle. This method comprises: detecting the tire pressure by using a wheel side pressure sensor installed at each wheel; wirelessly transmitting tire pressure information that indicates the detected tire pressure from a transmitter installed at each wheel; receiving the transmitted tire pressure information by a vehicle body-side receiver; and controlling the tire pressure to a target value based on the transmitted tire pressure information. If a reception-incapable condition, in which the tire pressure information cannot be received by the vehicle body-side receiver, occurs, the tire pressure is adjusted regardless of whether the transmitted tire pressure information is received.

In accordance with a fourth aspect of the present invention, there is provided a tire pressure control system that controls a tire pressure at each wheel of a vehicle. The tire pressure control system includes: a sensor that detects the wheel state of each wheel; a tire pressure regulating device that regulates the tire pressure by supplying and discharging air to and from the tire; and a control unit that controls the tire pressure to a target value by driving the tire pressure regulating device based on the detected wheel state, and that drives the tire pressure regulating device regardless of whether the wheel state has been obtained if a predetermined obtainment-incapable condition, in which the wheel state cannot be obtained, occurs.

In accordance with the tire pressure control system of the above aspects of the present invention, the safety of the vehicle can be improved by properly operating the tire pressure regulating device of the vehicle.

BRIEF DESCRIPTION OF THE DRAWINGS

The features and advantages of the present invention will become apparent from the following description of example embodiments, given in conjunction with the accompanying drawings, in which.

DETAILED DESCRIPTION OF THE EMBODIMENTS

Figure 1:
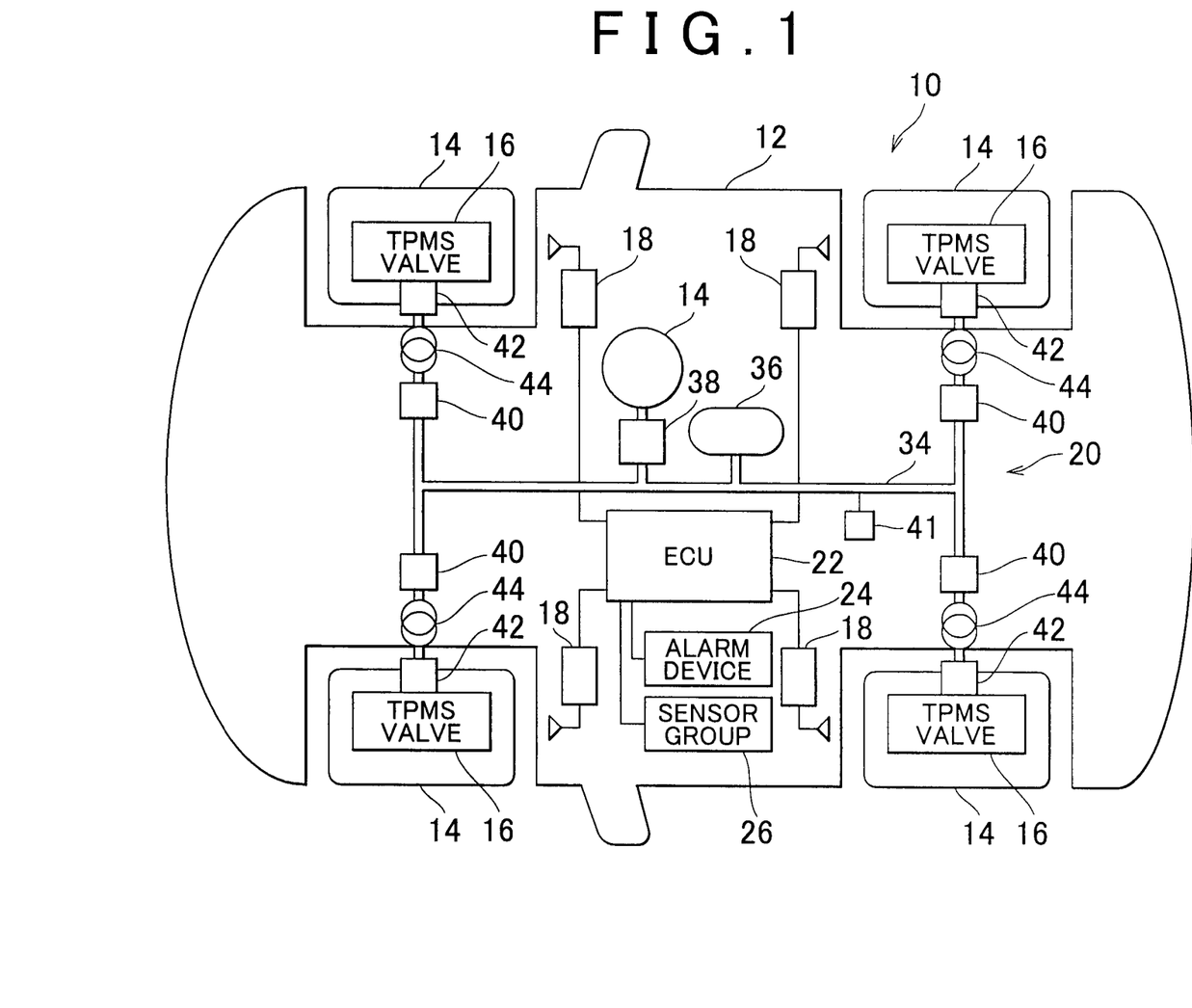
FIG. 1 shows a schematic diagram of a vehicle equipped with a tire pressure control system in accordance with an embodiment of the present invention.

Hereinafter, example embodiments of the present invention will be described in detail with reference to the accompanying drawings. FIG. 1 shows a schematic configuration of a vehicle equipped with a tire pressure control system in accordance with an embodiment of the present invention. The tire pressure control system functions together with a tire pressure monitoring system (TPMS) for monitoring the tire pressure of each tire.

The vehicle body 12 of a vehicle 10 is equipped with wheels 14 installed on both sides of the front and the rear thereof. Each wheel 14 is provided with a TPMS valve 16 that regulates the tire pressure thereof. Further, the vehicle body 12 includes an engine which is a driving power source of driving wheels, a transmission that transmits a driving power at a specific gear ratio, a steering device that steers each of the wheels 14, and a brake that applies a braking force to each wheel 14. An illustration and an explanation thereof are omitted.

The vehicle body 12 is further equipped with: four communications devices 18 corresponding to the respective wheels 14; a tire pressure regulating device 20 for regulating a tire pressure of each of the wheels 14; an electronic control unit (ECU) 22 for controlling the driving of various devices included in the vehicle 10; an alarm device 24 that warns a driver when a specified condition is satisfied; and a sensor group 26 including a vehicle speed sensor and the like.

The tire pressure regulating device 20 includes: a compressor 32 for providing compressed air with a specified tire pressure; an air line 34 that extends from a discharge chamber of the compressor 32 into the tire at each wheel 14; an air pressure tank 36 that temporarily retains the air compressed by the compressor 32; a pressure supply/discharge valve 38 for supplying and discharging air to and from the air line 34; a pressure raising/reducing valve 40 for raising and reducing the tire pressure at each wheel 14; a pressure sensor 41 that detects the air pressure in the air line 34, and the like.

The pressure supply/discharge valve 38 is, e.g., a 3-way electromagnetic valve having a inlet valve for opening or closing an air passage that connects the compressor 32 and the air line 34; and an exhaust valve for opening or closing an air passage that extends from the air line 34 to a discharge port (not shown), for switching air passages to the air line 34. The pressure raising/reducing valve 40 is an electromagnetic valve for regulating the tire pressure at each wheel 14. The pressure raising/reducing valve 40 includes: a pressure raising valve and a pressure reducing valve, wherein the pressure raising valve is opened when the compressor 32 is operating to introduce air into the tire, thereby increasing the tire pressure; and the pressure reducing valve is opened to discharge air from the tire, thereby reducing the tire pressure.

Each wheel 14 is provided with a pressure regulating valve 42 connected to the corresponding pressure raising/reducing valve 40 via the air line 34. The pressure regulating valve 42 is, e.g., an electromagnetic or a mechanical 3-way valve to control the introduction and discharge of air into and from the tire, and rotates together with the corresponding wheel 14. The pressure regulating valve 42 opens or closes to control communications between the air line 34 and the inside of the tire, thereby introducing and sealing the air supplied from the pressure raising/reducing valve 40 in the corresponding tire, or thereby discharging the air in the corresponding tire to the pressure raising/reducing valve 40. Further, the pressure regulating valve 42 is opened when the tire pressure exceeds a specified relief pressure threshold so that some of the air in the tire is discharged to the outside, thereby reducing the air pressure. In this embodiment, in normal tire pressure control, the tire pressure regulating device 20 is controlled to maintain the tire pressure within a preset upper limit pressure. The specified relief pressure threshold is set to be higher than the preset upper limit pressure for the normal tire pressure control. As a result, the pressure regulating valve 42 is prevented from being opened to discharge the air from the tire to the outside during the normal tire pressure control.

A rotary air seal 44 is disposed between the pressure raising/reducing valve 40 and the pressure regulating valve 42. The rotary air seal 44 is made of a seal member such as rubber or the like, and connects a non-rotary part of the vehicle body 12 in air line 34 to a rotary part of the wheel 14 slidably and airtightly. The presence of the rotary air seal 44 allows air in the air line 34 to be supplied into the tire of the rotating wheel 14.

Figure 2:
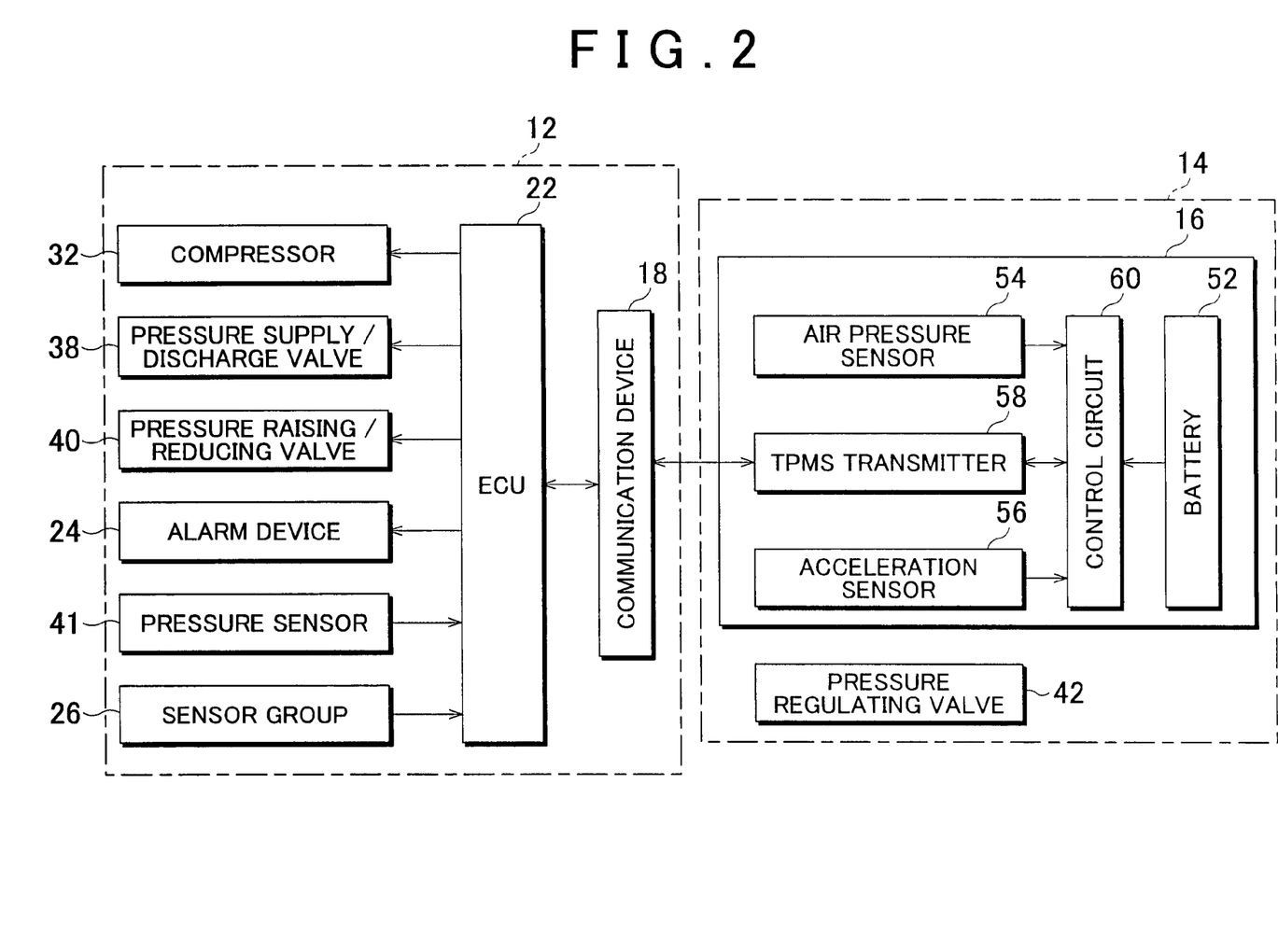
FIG. 2 is a block diagram of the tire pressure control system.

FIG. 2 is a block diagram of the air pressure control system.

A TPMS valve 16 is installed in a wheel rim (not shown) of each wheel 14, and has a protruded housing inside the tire thereof. By separating an outwardly protruded valve cap of the wheel rim of the TPMS valve 16 and then connecting a valve port with a hose of an air supply device, air can be supplied from the outside into the tire. Accommodated in the housing of the TPMS valve 16 are a battery 52, a tire pressure sensor 54, an acceleration sensor 56, a TPMS transmitter 58, a control circuit 60, and the like. Further, the pressure regulating valve 42 aforementioned is provided inside of the tire separately from the TPMS valve 16.

The battery 52 provides a source voltage to the tire pressure sensor 54, the acceleration sensor 56, the TPMS transmitter 58, the control circuit 60, and the like.

The tire pressure sensor 54 is, e.g., a semiconductor sensor. The tire pressure sensor 54 detects the tire pressure, which is one of wheel state indicators, and outputs, as wheel information, the tire pressure detection signal that indicates the tire pressure. The air pressure sensor 54 may have a piezoelectric sensor that generates an output voltage based on a magnitude of the tire pressure. Each tire pressure sensor 54 periodically detects the tire pressure in the corresponding tire and transmits the detected tire pressure to the control circuit 60. The detected tire pressure is used in state monitoring by the TPMS and also in tire pressure control by using an tire pressure control system. which will be described later.

The acceleration sensor 56 detects a driving state of the vehicle by using a so-called centrifugal switch, which is turned on when a centrifugal force stronger than a specified magnitude is applied thereto by rotation of the wheels 14. The tire pressure sensor 54 and the acceleration sensor 56 are installed in the housing of the TPMS valve 16 in this embodiment, but there may be provided other sensors to detect the wheel state. For example, there may be installed various sensors such as a temperature sensor for detecting an air temperature in a tire, a sensor for detecting a source voltage of the battery 52, and the like.

The TPMS transmitter 58 serves as a transmission unit capable of wireless transmission of the wheel information that includes signals indicating the detected tire pressure or the detected acceleration to the vehicle body 12.

The control circuit 60 is installed on a substrate in a form of an IC chip or the like, and controls a transmission timing of the TPMS transmitter 58 with respect to the wheel information. The control circuit 60 may be configured to electromagnetically drive the pressure regulating valve 42 based on a preset condition. In this embodiment, the control circuit 60 changes setting of a transmission mode of the TPMS transmitter 58 based on the detected tire pressure in order to deal with interfering waves or the like which will be described later. The control circuit 60 determines the transmission mode of the TPMS transmitter 58 by comparing the tire pressure variation obtained over a specified period of time based on the detected tire pressure with a predetermined threshold for determining the transmission mode. In this embodiment, the threshold for determining the transmission mode is used as a threshold for determining whether the compressor 32 is driven. That is, the compressor 32 is driven by operation of the tire pressure regulating device 20, and the air flowing through the air line 34 pulsates due to a discharge pressure by the compressor 32 while the compressor 32 is operating, thereby changing the tire pressure in the tire by a certain degree. As a result, when the variation of the tire pressure increases to a certain level, it is possible to estimate a driving state of the compressor 32 as well as the tire pressure regulating device 20. To be specific, the TPMS transmitter 58 has transmission modes, i.e., a normal transmission mode in which the detected tire pressure is transmitted at a low frequency, e.g., once per minute, and an emergency transmission mode in which the detected tire pressure is transmitted at a high frequency, e.g., once per fifteen seconds. When the variation of the tire pressure over the specified time period is smaller than or equal to the threshold for determining the transmission mode, a reception state of the vehicle body 12 is determined to be normal and, hence, the control circuit 60 selects the normal transmission mode as the transmission mode. However, when the variation of the tire pressure over the specified time period is greater than the threshold for determining the transmission mode, the control circuit 60 selects the emergency transmission mode as the transmission mode.

Meanwhile, each communications device 18 provided at the vehicle body 12 may also function as a receiver for receiving signals transmitted from the TPMS transmitter 58 from each corresponding wheel 14. Each communication device 18 outputs the information received from the TPMS transmitter 58 to the ECU 22.

The ECU 22 includes a CPU that executes various operations, a ROM for storing therein various control programs, a RAM used as a work area for program execution or data storage, a nonvolatile backup RAM for keeping a record of specific data, an input/output interface, and the like. The indicator device 24 and actuators such as the pressure supply/discharge valve 38, the pressure raising/reducing valve 40, and the compressor 32 of the tire pressure regulating device 20 are connected to the ECU 22 via specified communication lines. Further, a variety of sensors and switches such as the sensor group 26 including the vehicle speed sensor and the like, and the pressure sensor 41 installed in the tire pressure regulating device 20 are connected to the ECU 22 via specified communication lines. By executing the operation based on the information obtained from the various kinds of sensors/switches or the communication devices 18, the ECU 22 controls the driving of the actuators or the generating of a warning through the alarm device 24.

Because the ECU 22 stores the correspondence between the communication devices 18 and the wheels 14, it is possible to identify the wheel associated with the wheel information transmitted through the communication devices 18. Instead of providing the communication devices 18 at each wheel 14 in a single vehicle body 12, a single communication device capable of receiving the signals from each TPMS transmitter 58 may be provided. In that case, the signals transmitted by each TPMS transmitter 58 may include identification information that specifies the corresponding wheel 14. The wheel information from the TPMS transmitter 58 is stored in a storage area of, e.g., the backup RAM in the ECU 22. The ECU 22 monitors a state of each wheel 14 by using the information received from the respective communication devices 18.

Under the control of the ECU 22, the alarm device 24 warns the driver when a prescribed condition is satisfied, by generating sounds or by displaying information on, for example, a display unit installed on an instrument panel of the vehicle 10, indicating that an anomaly in the vehicle has occurred.

Hereinafter, an operation of the tire pressure regulating device 20 in accordance with this embodiment will be described. FIGS. 3 to 6 illustrate explanatory diagrams showing an outline of an operation of the tire pressure regulating device. The ECU 22 controls the execution of the operation.

Figure 3:
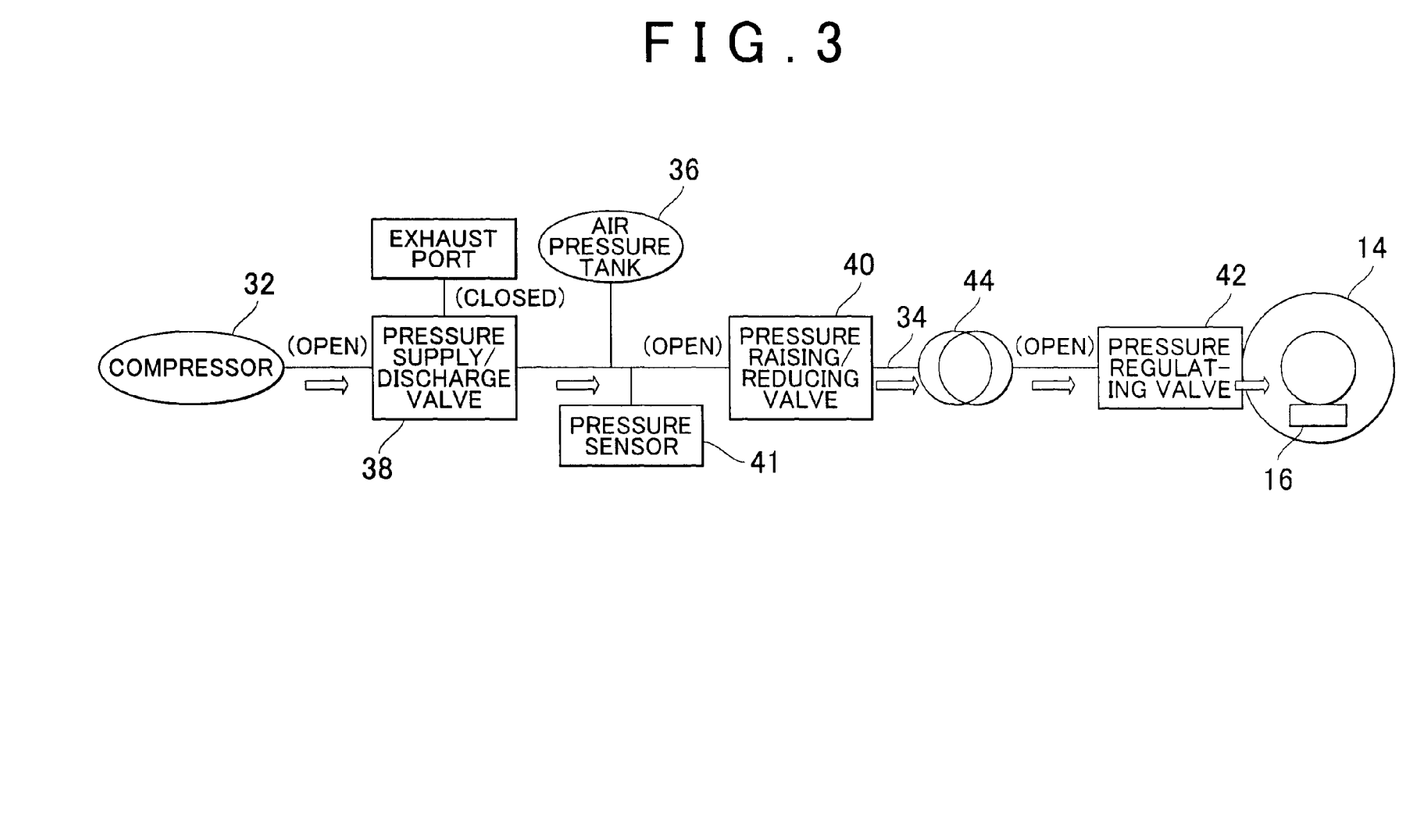
FIG. 3 provides an explanatory diagram describing an operation outline of a tire pressure regulating device.

FIG. 3 illustrates a state where air is introduced into the tire. When air is introduced into the tire, e.g., in order to increase the tire pressure, the compressor 32 is driven and, at the same time, the inlet valve of the pressure supply/discharge valve 38, the pressure raising valve of the pressure raising/reducing valve 40 and the pressure regulating valve 42 are opened. The compressor 32 draws in outside air and compresses the air drawn in to increase the pressure thereof. The high-pressure air discharged from the compressor 32 is introduced, together with the air contained in the air tank 36, into the tire of the corresponding wheel 14 via the pressure raising/reducing valve 40, the rotary air seal 44 and the pressure regulating valve 42, thereby increasing the tire pressure.

Figure 4:
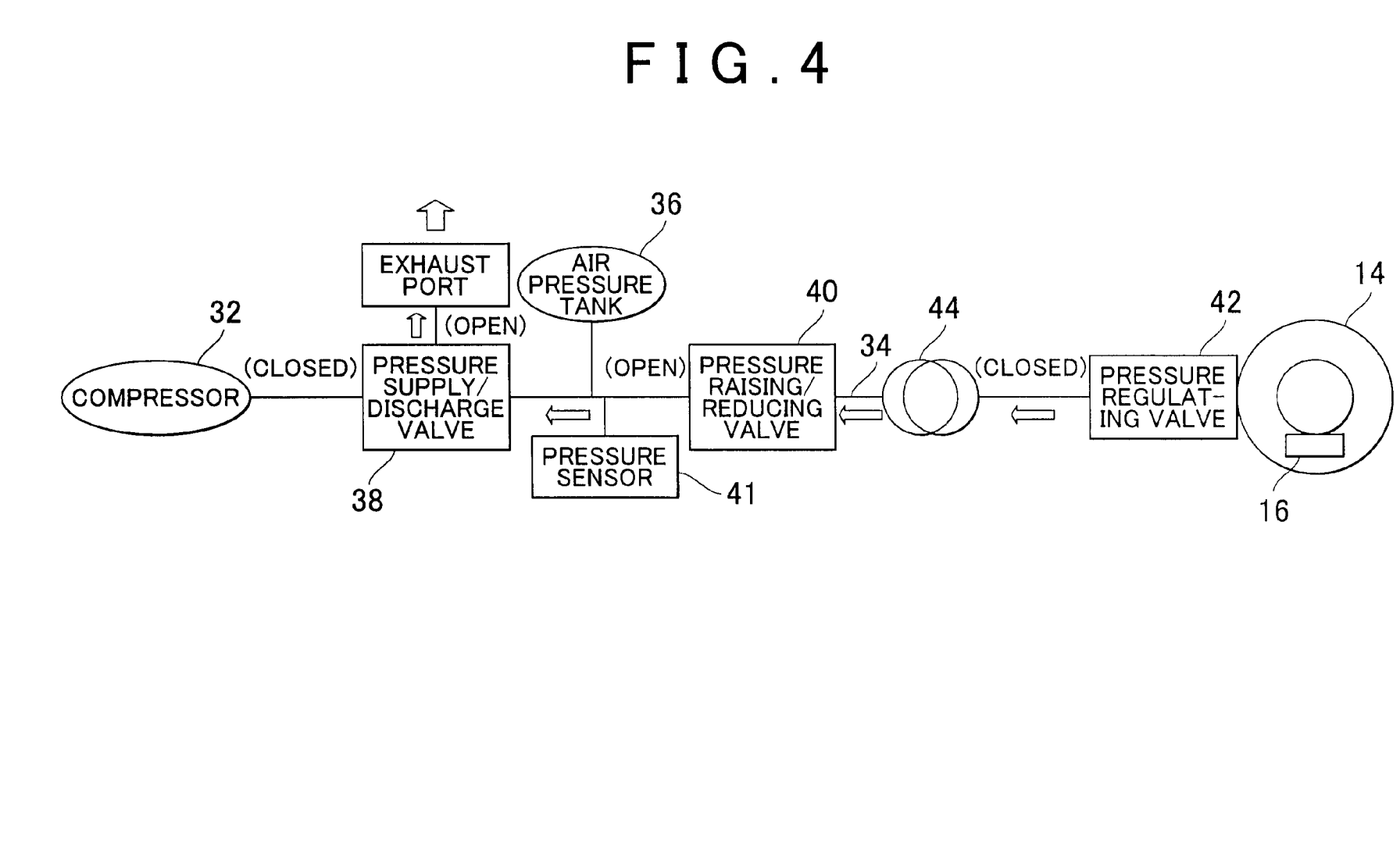
FIG. 4 represents an explanatory diagram showing the operation outline of the tire pressure regulating device.

FIG. 4 shows a state when an air pressure at a seal part is regulated. In the regulation of the air pressure at the seal part, the pressure at the rotary air seal 44 is restored to a atmospheric pressure in order to preserve durability of the rotary air seal 44. Namely, when an air is introduced into the tire, the air pressure in the air line 34 is maintained high such that the air may be introduced into the tire. In this state, if the rotary air seal 44 continues to slide, the rotary air seal 44 may be worn away. Therefore, after regulating the tire pressure is completed, the tire pressure at the rotary air seal 44 is reduced while it is blocked from communicating with the tire by closing the pressure regulating valve 42. In other words, the compressor 32 is stopped and, at the same time, the pressure reducing valve of the pressure raising/reducing valve 40 and the exhaust valve of the pressure supply/discharge valve 38 are opened while the pressure regulating valve 42 is closed. Accordingly, the air in the air line 34 is discharged from the exhaust port while the tire pressure is maintained, thereby reducing the air pressure at the rotary air seal 44 to the atmospheric pressure level.

Figure 5:
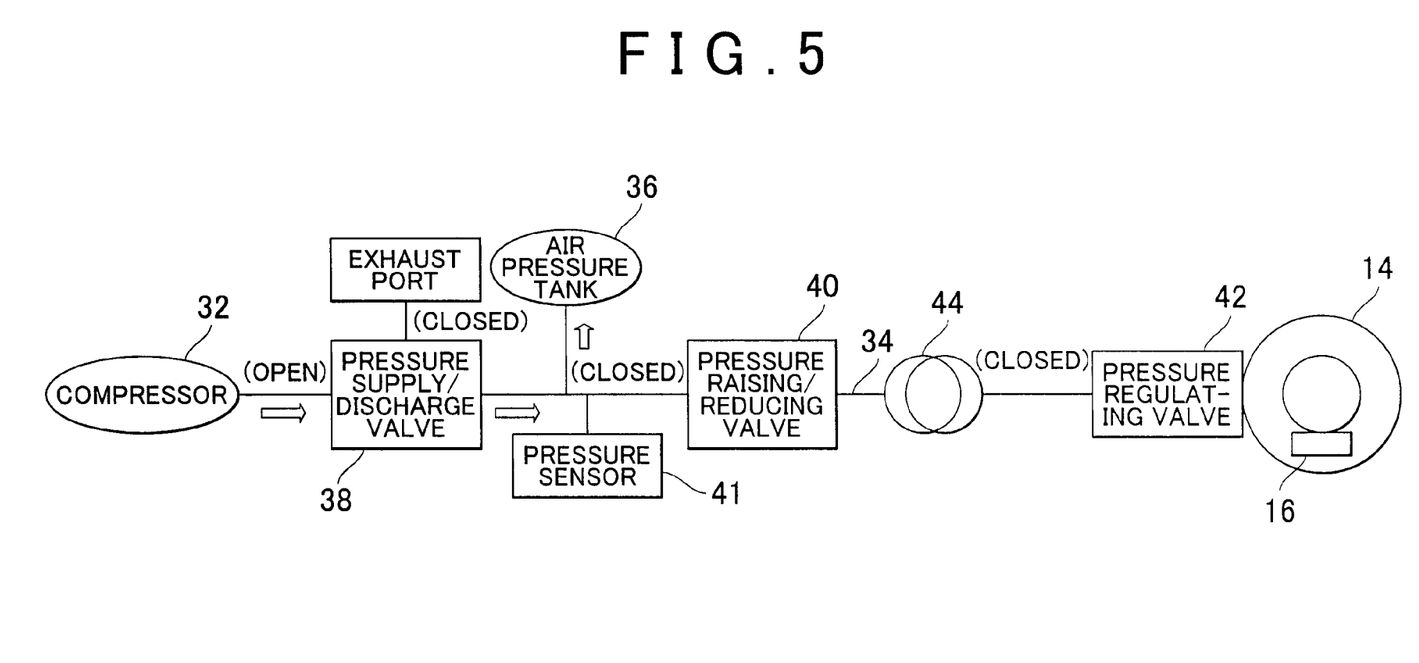
FIG. 5 offers an explanatory diagram showing the operation outline of the tire pressure regulating device.

FIG. 5 describes a normal control state in which air is neither supplied to nor discharged from the tire. In the normal control state, the air pressure in the air pressure tank 36 is increased and maintained at a specified level in order to prepare a next operation of introducing air into a tire. In other words, the compressor 32 is intermittently driven under the assumption that the air pressure in the air pressure tank 36 will decrease and, at the same time, the inlet valve of the pressure supply/discharge valve 38 is opened. At this time, the pressure raising/reducing valve 40 and the pressure regulating valve 42 remain closed, thereby the air whose pressure is increased by the compressor 32 is contained in the air pressure tank 36. When the air pressure in the air pressure tank 36 reaches a specified level, the operation of the compressor 32 is stopped. Further, because the pressure raising/reducing valve 40 is closed, the rotary air seal 44 is maintained at the atmospheric pressure.

Figure 6:
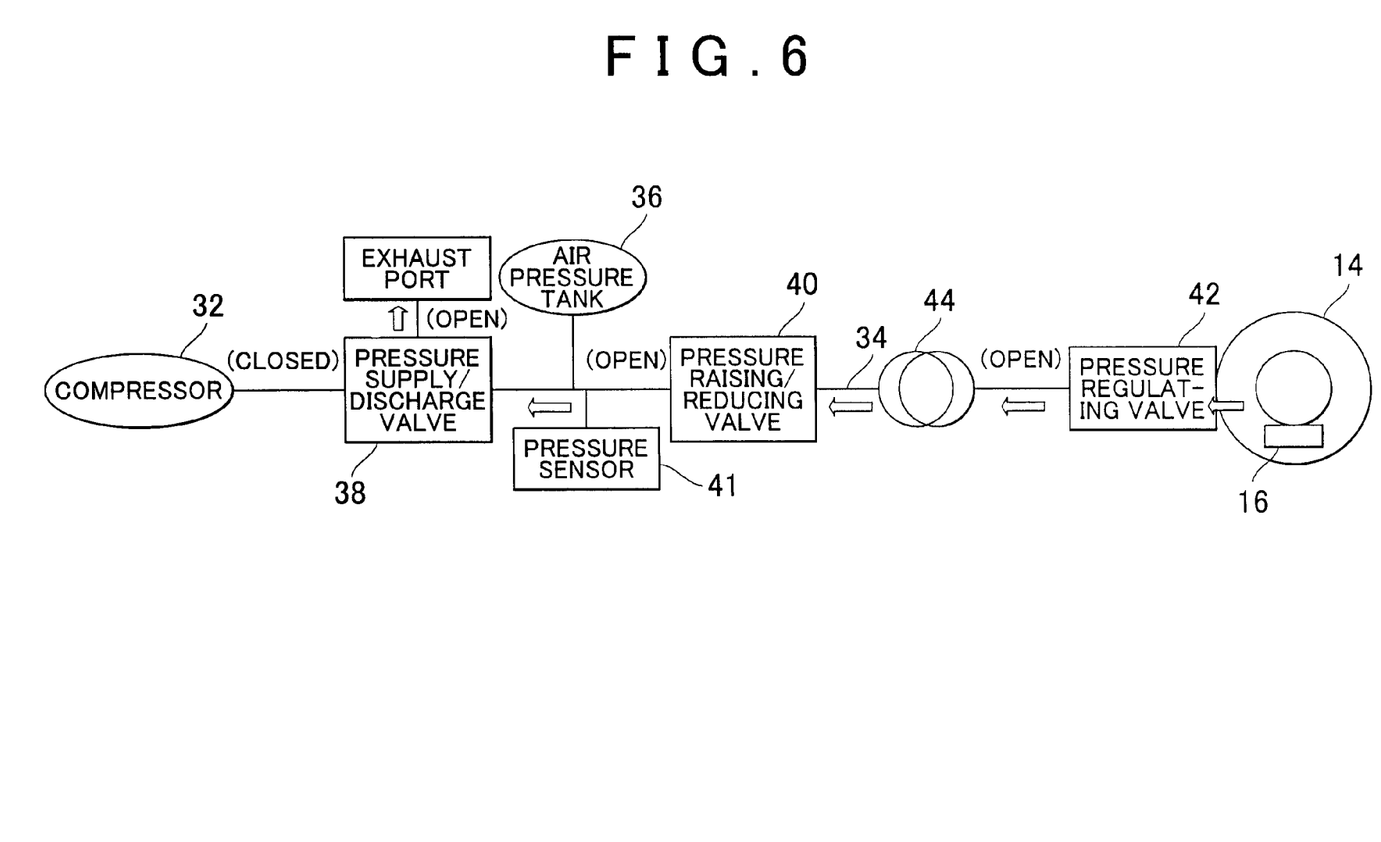
FIG. 6 presents an explanatory diagram showing the operation outline of the tire pressure regulating device.

FIG. 6 depicts a state of discharging air from the tire. As for discharging air from the tire, the pressure regulating valve 42, the pressure decrease valve of the pressure raising/reducing valve 40 and the exhaust valve of the pressure supply/discharge valve 38 are open while the compressor 32 is stopped. Accordingly, air in the tire is discharged from the exhaust port via the air line 34, whereby the tire pressure is reduced. The discharge of air is required to be performed when the tire pressure needs to be reduced, e.g., when the vehicle 10 is traveling in a desert, on a snowy road, or the like. Moreover, the discharge of air from the tire may be done by opening the exhaust port of the pressure regulating valve 42. In this embodiment, air is discharged via a drier provided at the exhaust port of the pressure supply/discharge valve 38 in order to remove moisture in the air to be discharged to the outside.

Hereinafter, a tire pressure control method of this embodiment will be described. In this embodiment, the ECU 22 obtains tire pressure information, at a constant period, from the TPMS valves 16. When it is determined that the tire pressure at any one of the wheels 14 is lower than a preset reference tire pressure, the tire pressure regulating device 20 is driven by the ECU 22, thereby increasing the tire pressure as shown in FIG. 3. At this time, the tire pressure is adjusted to the target tire pressure by regulating as shown in FIGS. 4 and 5 when necessary.

However, if the tire pressure information transmitted from the TPMS transmitter 58 cannot be normally received through the communication devices 18 in the vehicle body 12 due to, e.g., noises or interfering waves in the environment, the ECU 22 cannot control the tire pressure based on the tire pressure information. As a result, even if the tire pressure at each wheel 14 is below the reference value, the low tire pressure condition cannot be corrected.

Accordingly, in this embodiment, if the wheel information including tire pressure information, which can be recognized through the communications devices 18, is not obtained after a specific period of time, the ECU 22 forcibly drives the air pressure regulating device 20 to adjust the tire pressure at each tire. At this time, the pressure increase valve of the pressure raising/reducing valve 40 and the regulation valve are opened so that the tire pressure becomes substantially equal to that in the air passage of the air line 34. Accordingly, the tire pressure may be detected using the pressure sensor 41, which allows the adjustment of the tire pressure to be close to the target tire pressure.

Meanwhile, in the respective wheels 14, the TPMS valves 16 recognize the driving of the tire pressure regulating device 20 based on a magnitude of the tire pressure variation detected by the tire pressure sensor 54. Then, when the magnitude of the variation exceeds a specified value, the control circuit 60 sets the emergency transmission mode as the transmission mode to reduce the transmission intervals of the wheel information from the TPMS transmitter 58.

In other words, while the tire pressure regulating device 20 is operating, the tire pressure varies by the pulsation of the discharge pressure of the compressor 32. Therefore, when the variation of the tire pressure is detected, it is determined that the tire pressure regulating device 20 is operating. Here, because the tire pressure regulating device 20 is operating, it is determined that external noise superposition or electromagnetic interference may occur in the tire pressure information and therefore the transmission rate of the tire pressure information is set to be higher. As a result, the communication devices 18 are more likely to normally receive the tire pressure information without being affected by radio wave interference. If the tire pressure information is normally received by the communication devices 18 by above-mentioned procedures, the ECU 22 executes the tire pressure control based on the tire pressure information.

Figure 7:
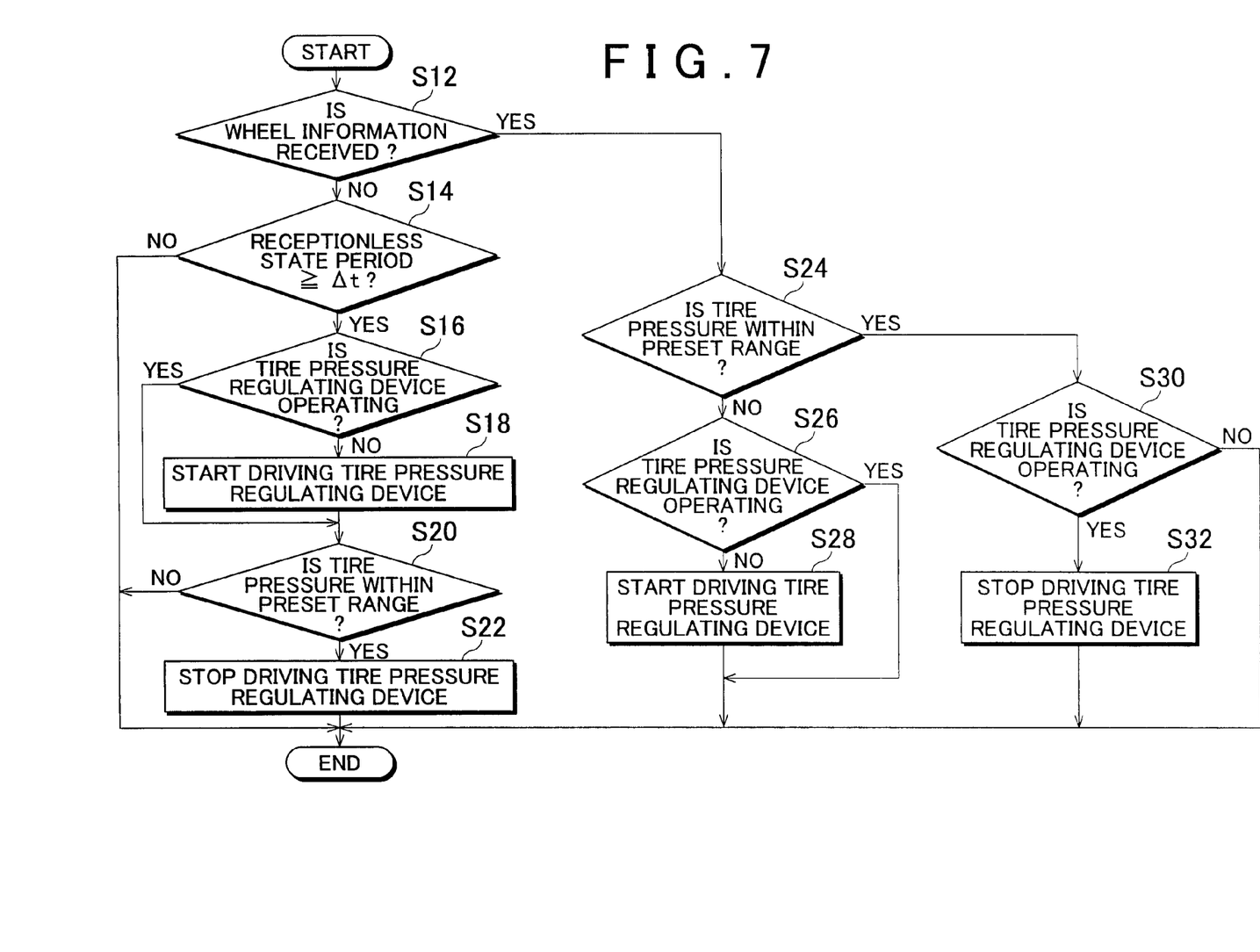
FIG. 7 is a flowchart illustrating a main process of a tire pressure control performed by an ECU.

Hereinafter, a flow of the tire pressure control process in this embodiment will be described. FIG. 7 is a flowchart showing a main part of the tire pressure control process performed by the ECU. The ECU 22 performs this process at predetermined intervals after an ignition switch (not shown) of the vehicle 10 is turned on.

The ECU 22 determines whether the wheel information from the TPMS valves 16 is obtained through the communication devices 18 (Step 12). If the wheel information has not been obtained (NO in Step 12), the ECU 22 determines whether the state where the wheel information is not obtained has persisted for a prescribed time period Δt (Step 14). The prescribed time period Δt may be empirically determined by measuring the time period over which the wheel information may be reliably obtained during a normal communication state between the wheel and the vehicle body.

If it is determined that the wheel information has not been received during the prescribed time period Δt (YES in Step 14), and also if the tire pressure regulating device 20 is not operating (i.e., the compressor 32 is not driven) (NO in Step 16), the ECU 22 initiates driving the tire pressure regulating device 20 (Step 18). Meanwhile, if the tire pressure regulating device 20 is driven (YES in Step 16), the operation skips Step 18. Next, the ECU 22 checks whether the tire pressure is within a preset range based on an output value of the pressure sensor 41 (Step 20). If the tire pressure is within the preset range (YES in S20), the driving of the tire pressure regulating device 20 is stopped (Step 22). However, if the air pressure is out of the preset range (NO in Step 20), the operation skips Step 22, and the tire pressure regulating device 20 continues to be driven.

Meanwhile, if the wheel information has not been received for less than the prescribed time period Δt (NO in Step 14), the operation skips Step 16 to Step 22. Accordingly, even if the wheel information is not obtained, the tire pressure at each wheel 14 is maintained at a preset value.

If it is determined that the wheel information is obtained from the TPMS valves 16 (YES in Step 12), the ECU 22 executes the normal tire pressure control. In other words, at first, the ECU 22 determines whether the tire pressure is within the preset range based on the tire pressure information included in the received wheel information (Step 24). If the tire pressure is outside of the preset range (NO in Step 24), and also if the tire pressure regulating device 20 is not driven (NO in Step 26), the ECU 22 begins driving the air pressure regulating device 20 (Step 28). On the other hand, if the tire pressure regulating device 20 is being driven in the Step 26 (YES in Step 26), the operation skips Step 28.

In addition, if the tire pressure is within the setting range in Step 24 (YES in Step 24), and also if the tire pressure regulating device 20 is being driven (YES in Step 30), the ECU 22 stops driving the tire pressure regulating device 20 (Step 32). However, if the tire pressure regulating device 20 is not being driven in Step 30 (NO in Step 30), the operation skips Step 32.

Figure 8:
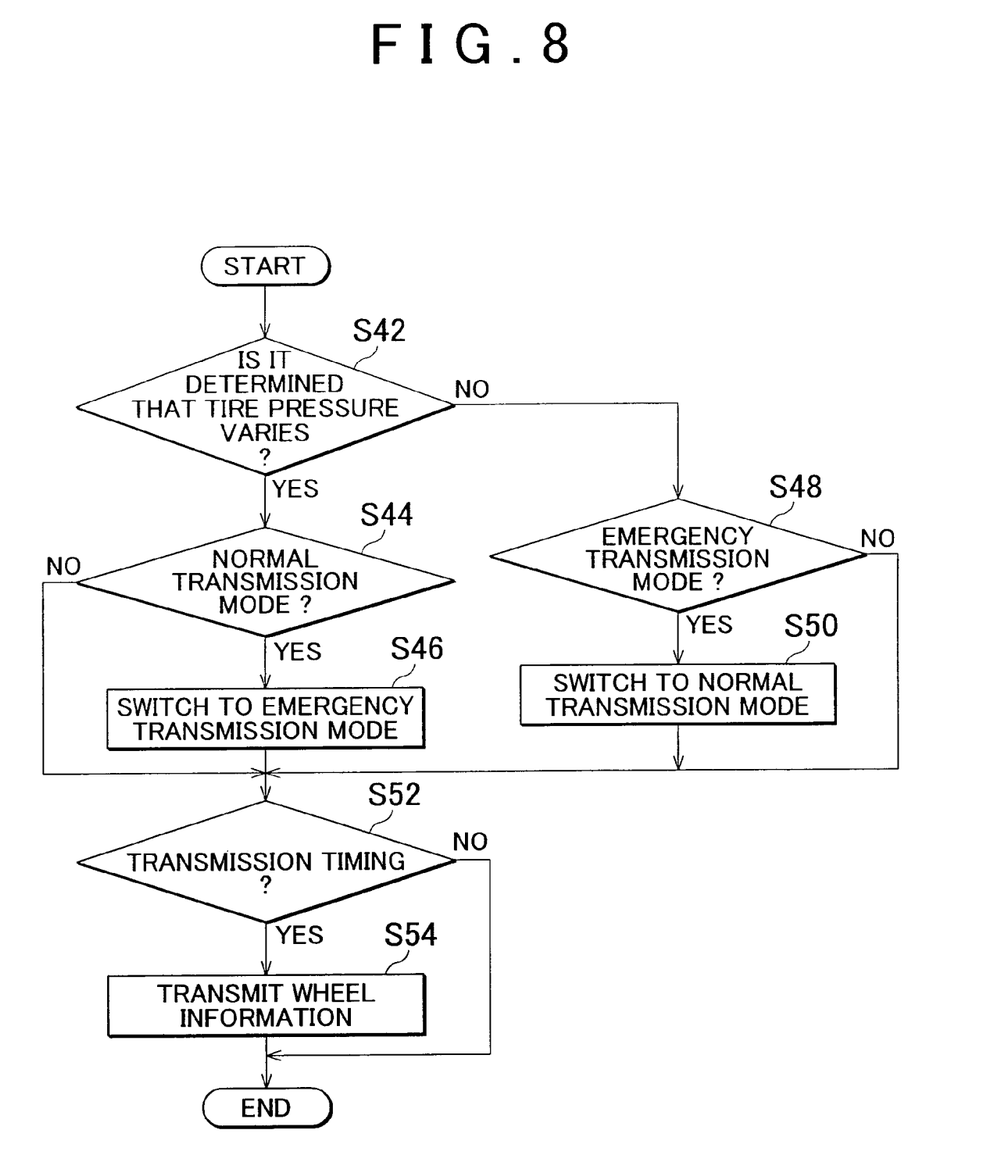
FIG. 8 depicts a flowchart illustrating a sequence of a process performed by a control circuit of a TPMS valve.

FIG. 8 provides a flowchart depicting a flow of a process executed by the control circuit of the TPMS valve. The process is concurrently performed with the process executed by the ECU 22 in FIG. 7. First, the control circuit 60 determines whether the air pressure varies based on the output value of the air pressure sensor 54 (Step 42). In other words, if air pressure variation observed over a specific period of time by the air pressure sensor 54 is smaller than or equal to a threshold for determining the transmission mode, it is determined by the control circuit 60 that there is no variation in the air pressure. In contrast, when the tire pressure variation over a specific period of time is greater than the threshold value for determining the transmission mode, the control circuit 60 determines that there is variation in the tire pressure. If it is determined that the tire pressure varies (YES in Step 42), and that the transmission timing of the wheel information is set to the normal transmission mode (YES in Step 44), the control circuit 60 switches the transmission mode to the emergency transmission mode (Step 46) to reduce the transmission period. However, if the transmission mode is set to the emergency transmission mode (NO in Step 44), the operation skips Step 46.

On the other hand, if it is determined that the tire pressure does not vary (NO in Step 42), and that the transmission timing of the wheel information is set to the emergency transmission mode (YES in Step 48), the control circuit 60 switches the transmission mode to the normal transmission mode (Step 50), thereby restoring the original transmission interval. However, if the transmission mode is instead set to the normal transmission mode (NO in Step 48), the operation skips Step 50.

When the transmission timing corresponding to the set transmission mode arrives (YES in Step 52), the control circuit 60 transmits the wheel information including the tire pressure information via the TPMS transmitter 58 (Step 54). That is, when the normal transmission mode is set, the wheel information is transmitted at a low frequency, e.g., once per minute. However, if the emergency transmission mode is set instead of the normal transmission mode, the wheel information is transmitted at a high frequency, e.g., once per fifteen seconds. In contrast, if the transmission timing has not arrived in Step 52 (NO in Step 52), the operation skips Step 54.

If the tire pressure information, which can be recognized through the communications devices 18, is not obtained after a specific period of time, the ECU 22 drives the tire-pressure regulating device 20 even though there is no reception of the tire pressure information from the TPMS valves 16 of the wheels 14. Further, the tire pressure control is executed based on the tire pressure information obtained by the pressure sensor 41 in the vehicle body 12. Consequently, even when the tire pressure is low when the tire pressure information cannot be obtained from the vehicle body, the tire pressure can be appropriately adjusted, thereby ensuring the safety of the vehicle. Further, when the tire pressure regulating device 20 is driven, the transmission period of the wheel information in the wheel 14 is reduced. Therefore, even if a communication error occurs between the wheel 14 and the vehicle body 12 due to, e.g., noises or interfering waves in the environment, parts of the wheel information may reach the communication devices 18 without being corrupted by the interfering waves or the like. In such a case, the normal tire pressure control based on the tire pressure information transmitted from the wheels 14 can be carried out. Moreover, by reducing the transmission period, it is possible to estimate whether the receptionless state of the wheel information is temporary or permanent based on whether the wheel information can be obtained.

In this embodiment, the ECU 22 serves as the control unit and the air pressure control device. The compressor 32, the pressure regulating valve 42, the pressure sensor 41 and the air pressure sensor 54 serve as a tire pressure generating unit, a relief unit, a vehicle body side pressure sensor and a wheel side pressure sensor, respectively. Furthermore, the pressure raising/reducing valve 40 forms a switching valve.

While the invention has been shown and described with respect to the example embodiments, it will be understood by those skilled in the art that various changes and modification may be made without departing from the scope of the invention.

The above embodiment assumes a case affected by, e.g., noises or interfering waves from the environment and describes the driving of the tire pressure regulating device 20 when the ECU 22 has not received detectable wheel information for a prescribed period of time. In a modified embodiment of the invention, however, the TPMS transmitter 58 may be configured to transmit to the ECU 22 the transmission stop information, such as a sleep signal, announcing in advance the transmission stop caused if the TPMS transmitter 58 receives the transmission stop instruction from a certain instrument or noises from the environment having a pattern similar to that of the transmission stop instruction. Further, the tire pressure regulating device 20 may also be driven if ECU 22 receives the transmission stop information.

Further, in the above embodiment, the information representing the tire pressures is obtained by the pressure sensor 41 installed on the air line 34. Meanwhile, in another modified embodiment of the invention, a tank pressure sensor is installed in the air tank 36 to detect the air pressure therein, and the detected tank pressure is used as the air pressure information. As for the tank pressure sensor, a sensor may be used to monitor whether the pressure in the air tank 36 has reached or is maintained at a specified level in the normal control operation. When the air pressure is introduced, the air pressure in the air tank 36 becomes substantially equal to that in the air line 34. Therefore, the information representing the tire pressure in the tires of the wheels 14 may be obtained from the tank pressure sensor. Further, although it is not described in the above embodiment, when the wheel information cannot be normally received by the ECU 22, the tire pressure regulating device 20 may be driven intermittently, instead of being driven constantly, making it possible to improve the durability of the rotary air seal 44. If the function of the pressure regulating valve 42 serving as the relief unit becomes unnecessary as a result of such an operation, it can be omitted. In the above embodiment, the driving of the compressor 32 is stopped when the tire pressure is within the preset range as depicted in FIG. 7. Meanwhile, in the modified embodiment of the invention, the driving of the compressor 32 is stopped, e.g., when the ignition switch is turned off, when signals satisfying the condition for stopping an operation of the compressor 32 is transmitted to the ECU 22 by an operator such as a driver or a dealer, or when signals having the tire pressure information is received from the TPMS transmitter 58.

While the invention has been shown and described with respect to the example embodiments, it will be understood by those skilled in the art that various changes and modification may be made without departing from the scope of the invention as defined in the following claims.

The invention claimed is:

1. A tire pressure control system that controls a tire pressure at each wheel of a vehicle, comprising:
   a wheel side pressure sensor, installed at each wheel, that detects the tire pressure;
   a transmitter, installed at each wheel, that wirelessly transmits tire pressure information that indicates the detected tire pressure;
   a receiver, installed at a vehicle body, that receives the tire pressure information transmitted by the transmitter;
   a tire pressure regulating device, installed at the vehicle body, that regulates the tire pressure by supplying and discharging air to and from the tire; and
   a control unit that controls the tire pressure to a target value by driving the tire pressure regulating device based on the tire pressure information received by the receiver,
   wherein the control unit drives the tire pressure regulating device regardless of whether the tire pressure information is received if a reception-incapable condition, in which the receiver is unable to receive the tire pressure information, occurs.

2. The tire pressure control system according to claim 1, further comprising:
   a relief unit that maintains the tire pressure lower than or equal to a relief pressure threshold by discharging air from the tire when the air pressure exceeds the relief pressure threshold.

3. The tire pressure control system according to claim 2, wherein when the tire pressure information is obtained, the control unit controls the tire pressure regulating device to make the tire pressure lower than or equal to an upper limit pressure, and
   wherein the relief pressure threshold is set to be higher than the upper limit pressure.

4. The tire pressure control system according to claim 1, further comprising:
   a control circuit, installed at each wheel, that regulates transmission timings of the tire pressure information from the transmitter,
   wherein the control circuit reduces an interval between the transmission timings of the tire pressure information from the transmitter when a tire pressure variation is detected by the wheel side pressure sensor.

5. The tire pressure control system according to claim 1, wherein the tire pressure regulating device includes:
   an air compressor, installed on the vehicle body, that compresses air;
   an air passage extending from the air compressor to an inside of the tire;
   a switching valve that opens and blocks the air passage to the inside of the tire; and a vehicle body side pressure sensor, installed on the vehicle body, that detects an air pressure in the air passage, wherein if it is determined that the reception-incapable condition has occurred, the control unit drives the tire pressure regulating device based on tire pressure information obtained by opening the switching valve so that the air passage communicates with the inside of the tire and the tire pressure is regulated based on air pressure information obtained by the vehicle body side pressure sensor.

6. The tire pressure control system according to claim 5, wherein the control unit obtains the tire pressure information from the vehicle body side pressure sensor through a communication line arranged in the vehicle body.

7. The tire pressure control system according to claim 5, wherein the tire pressure regulating device includes:
an air pressure tank, installed between the switching valve and the air compressor, that stores air compressed by the air compressor; and
a tank pressure sensor that detects an air pressure in the air pressure tank,
wherein if it is determined that the reception-incapable condition has occurred, the control unit opens the switching valve to allow the air passage to communicate with the inside of the tire, and obtains tire pressure information from the tank pressure sensor as the tire pressure information of the vehicle body side pressure sensor.

8. The tire pressure control system according to claim 1, wherein the control unit determines that the reception-incapable condition has occurred if the receiver has not received the detected tire pressure information for at least a specific time period.

9. The tire pressure control system according to claim 1, wherein the control unit determines that the reception-incapable condition has occurred if the receiver receives transmission stop information, which gives an advance notice of a transmission stop, from the transmitter.

10. The tire pressure control system according to claim 1, wherein the transmitter transmits wheel information including the tire pressure information of each wheel to a vehicle body side, and
wherein the control unit monitors states of the wheels based on the wheel information.

11. A tire pressure control device, installed in a vehicle, that controls a tire pressure at each wheel of a vehicle, wherein the vehicle includes: a wheel-side pressure sensor, installed at each wheel, that detects the tire pressure thereof; a transmitter, installed at each wheel, that wirelessly transmits of tire pressure information indicating the tire pressure; and tire pressure regulating device, installed on the vehicle body, that regulates the tire pressure by supplying and discharging air to and from the tire, wherein:
the tire pressure control device outputs, to the tire pressure regulating device, a control signal to adjust the tire pressure to a target value based on the tire pressure information transmitted from the transmitter; and
the tire pressure control device outputs a control signal to drive the tire pressure regulating device regardless of whether the tire pressure information is received, if it is determined that a reception-incapable condition, in which the receiver cannot receive the tire pressure information, has occurred.

12. A tire pressure control method of a tire at each wheel of a vehicle, comprising:
detecting the tire pressure by using a wheel side pressure sensor installed at each wheel;
wirelessly transmitting tire pressure information that indicates the detected tire pressure from a transmitter installed at each wheel;
receiving the transmitted tire pressure information by a vehicle body-side receiver; and
controlling the tire pressure to a target value based on the transmitted tire pressure information,
wherein if a reception-incapable condition, in which the tire pressure information cannot be received by the vehicle body-side receiver, occurs, the tire pressure is adjusted regardless of whether the transmitted tire pressure information is received.

13. The tire pressure control method according to claim 12, further comprising:
regulating transmission timing of the tire pressure information, wherein an interval between the transmission timings of the tire pressure information is reduced if the detected tire pressure varies.

14. The tire pressure control method according to claim 12, wherein the vehicle includes: an air compressor that compresses air; an air passage extending from the air compressor to an inside of the tire; a switching valve that opens and closes the air passage to the inside of the tire; and a vehicle body side pressure sensor, installed on a vehicle body, that detects an air pressure in the air passage,
wherein if it is determined that the reception-incapable condition has occurred, the switching valve is opened so that the air passage communicates with the inside of the tire and the tire pressure is regulated based on air pressure information obtained by the vehicle body side pressure sensor.

15. The tire pressure control method according to claim 14, wherein the air pressure information from the vehicle body side pressure sensor is obtained through a communication line arranged in the vehicle body.

16. The tire pressure control method according to claim 14, wherein the vehicle includes: an air pressure tank, installed between the switching valve and the air compressor, that stores air compressed by the air compressor; and a tank pressure sensor that detects the air pressure in the air pressure tank, and
wherein if it is determined that the reception-incapable condition has occurred, the switching valve is controlled to be open so that the air passage communicates with the inside of the tire, and the tire pressure of the vehicle body side pressure sensor is determined using the tank pressure sensor.

17. The tire pressure control method according to claim 12, wherein it is determined that the reception-incapable condition has occurred if the tire pressure information is not obtained from the transmitter via the vehicle body-side receiver for at least a specific period of time.

18. The tire pressure control method according to claim 12, wherein it is determined that the reception-incapable condition has occurred if transmission stop information, which gives an advance notice of a transmission stop, is received from the transmitter.

19. The tire pressure control method according to claim 12, wherein wheel information including the tire pressure information of each wheel is transmitted from the transmitter to a vehicle body side, and
wherein states of the wheels are monitored based on the wheel information.

* * * * *